(12) United States Patent
Hugues et al.

(10) Patent No.: US 9,914,380 B2
(45) Date of Patent: Mar. 13, 2018

(54) FOAM PART, IN PARTICULAR FOR A VEHICLE SEAT, AND METHOD AND TOOL FOR PRODUCING A FOAM PART

(71) Applicant: JOHNSON CONTROLS GMBH, Burscheid (DE)

(72) Inventors: Laurent Hugues, Soultz les Bains (FR); Karsten Hilger, Lohmar-Honrath (DE); Bernhard Riezler, Altenmarkt (AT); Horst Steinmeier, Lübbecke (DE); Mohsin Benamar, Engelskirchen (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 238 days.

(21) Appl. No.: 14/759,052

(22) PCT Filed: Dec. 20, 2013

(86) PCT No.: PCT/EP2013/077630
§ 371 (c)(1),
(2) Date: Jul. 2, 2015

(87) PCT Pub. No.: WO2014/106592
PCT Pub. Date: Jul. 10, 2014

(65) Prior Publication Data
US 2015/0336492 A1    Nov. 26, 2015

(30) Foreign Application Priority Data

Jan. 4, 2013  (DE) .................. 10 2013 000 244
Feb. 15, 2013 (DE) .................. 10 2013 002 826
May 22, 2013 (DE) .................. 10 2013 209 465

(51) Int. Cl.
*B60N 2/64* (2006.01)
*B29C 44/06* (2006.01)
(Continued)

(52) U.S. Cl.
CPC .......... *B60N 2/646* (2013.01); *B29C 44/0461* (2013.01); *B29C 44/0469* (2013.01);
(Continued)

(58) Field of Classification Search
CPC .... B60N 2/646; B60N 2/7035; B60N 2/7017; B60N 2/7029; B29L 2031/771;
(Continued)

(56) References Cited

U.S. PATENT DOCUMENTS 3,137,523 A    6/1964  Karner
3,770,318 A   11/1973  Fenton
(Continued)

FOREIGN PATENT DOCUMENTS

CN    101 090 653 A   12/2007
CN    101 150 973 A    3/2008
(Continued)

*Primary Examiner* — Milton Nelson, Jr.
(74) *Attorney, Agent, or Firm* — McGlew and Tuttle, P.C.

(57) ABSTRACT

A foam part (5, 105, 205, 305), in particular for a vehicle seat, includes a first foam layer (11, 111, 211, 311) facing a user and a second foam layer (21, 221) facing away from the user. The first foam layer has a hardness and/or density that is different from the hardness or density of the second foam layer (21, 221). The first foam layer includes several comfort tubes (50, 150, 250, 350) facing the user. A method for producing such a foam part (5, 105, 205, 305) includes a first step in which the first foam layer, having the comfort tubes (50, 150, 250, 350), is foamed and a second step in which the second foam layer (21, 221) is foamed. A tool (500) for producing a foam part (5, 105, 205, 305) includes a bottom part (510), a frame (520), and a top part (530).

19 Claims, 6 Drawing Sheets

(51) Int. Cl.
  *B29C 44/04* (2006.01)
  *B60N 2/70* (2006.01)
  *B29K 75/00* (2006.01)
  *B29K 105/04* (2006.01)
  *B29L 31/00* (2006.01)

(52) U.S. Cl.
  CPC ............... *B29C 44/06* (2013.01); *B60N 2/70* (2013.01); *B60N 2/7017* (2013.01); *B60N 2/7023* (2013.01); *B60N 2/7029* (2013.01); *B60N 2/7035* (2013.01); *B29K 2075/00* (2013.01); *B29K 2105/04* (2013.01); *B29K 2623/06* (2013.01); *B29L 2031/771* (2013.01)

(58) Field of Classification Search
  CPC ............ B29K 2623/06; B29K 2075/00; B29K 2105/04; B29C 44/06; B29C 44/0469; B29C 44/0461
  USPC ........................................ 297/452.46, 452.27
  See application file for complete search history.

(56) References Cited

U.S. PATENT DOCUMENTS

| | | | | |
|---|---|---|---|---|
| 4,190,697 A | * | 2/1980 | Ahrens | ............... B29C 44/0461 264/168 |
| 4,265,484 A | * | 5/1981 | Stalter | ...................... A47C 7/20 267/142 |
| 5,408,711 A | * | 4/1995 | McClelland | ......... A47C 21/046 297/452.47 |
| 6,546,578 B1 | | 4/2003 | Steinmeier | |
| 8,025,964 B2 | * | 9/2011 | Landvik | ................. A47C 27/15 428/213 |
| 2010/0314929 A1 | | 12/2010 | Hsu | |

FOREIGN PATENT DOCUMENTS

| | | |
|---|---|---|
| CN | 102 164 726 A | 8/2011 |
| CN | 102 348 577 A | 2/2012 |
| DE | 19 53 004 A1 | 4/1971 |
| DE | 200 14 059 U1 | 8/2001 |
| DE | 202 02 042 U1 | 6/2002 |
| DE | 20 2007 002 196 U1 | 5/2007 |
| DE | 10 2009 011736 A1 | 9/2010 |
| EP | 1 142 683 A2 | 10/2001 |
| EP | 1 068 094 B1 | 8/2002 |
| JP | S48-32108 Y1 | 10/1973 |
| JP | H02-140107 A | 5/1990 |
| JP | 30 25 612 U | 4/1996 |
| JP | 2006-035916 A | 2/2006 |
| JP | 2007 084039 A | 4/2007 |
| JP | 2012-502817 A | 2/2012 |
| JP | 2012-224234 A | 11/2012 |
| SU | 1324886 A1 * | 7/1987 |
| WO | 01/74557 A1 | 10/2001 |
| WO | 2010/034424 A2 | 4/2010 |
| WO | 2010/102785 A2 | 9/2010 |

\* cited by examiner

FOAM PART, IN PARTICULAR FOR A VEHICLE SEAT, AND METHOD AND TOOL FOR PRODUCING A FOAM PART

CROSS REFERENCE TO RELATED APPLICATIONS

This application is a United States National Phase application of International Application PCT/EP2013/077630 and claims the benefit of priority under 35 U.S.C. § 119 of German Patent Application DE 10 2013 000 244.3 filed on Jan. 4, 2013, DE 10 2013 002 826.4 filed on Feb. 15, 2013 and DE 10 2013 209 465.5 filed on May 22, 2013, the entire contents of which are incorporated herein by reference.

FIELD OF THE INVENTION

The present invention to a foam part, in particular for a vehicle seat, having a first foam tier which faces a user, and a second foam tier which faces away from the user, wherein the first foam tier has a hardness and/or density which is different from the second foam tier and to a method for producing the foam part and to a tool for producing the foam part.

BACKGROUND OF THE INVENTION

By way of use, foam parts for vehicle seats, which serve as upholstery for the seat structure and are to offer the user of the vehicle seat as good a seating comfort as possible, are known. The seat upholstery mostly comprises a foam part for the seat cushion and a foam part for the seat back, which is separate from the former. Each of the two foam parts has a central region and two side panels. In the case of a foam part for the seat cushion, the central region of the foam part supports the buttocks and the rear sides of the thighs of the occupant of the vehicle seat in the downward direction, while the two side panels laterally bear on in each case one thigh and, on account thereof, may absorb transverse forces acting on the occupant, in particular when cornering. In the case of a foam part for the seat back, the central region of the foam part supports the back of the occupant in a rearward direction, while the two side panels laterally bear on the back and, on account thereof, may absorb transverse forces acting on the occupant.

EP 1 068 094 B1 discloses a foam part having for increased comfort a plurality of mutually adjacent tubular portions which are molded onto a main body of the foam part and extend upward in a substantially perpendicular manner to the seat face away from the main body. As the occupant sits down, the tubular portions are initially compressed while the main body is only insubstantially deformed. It is only after significant deformation of the tubular portions that the main body is more intensely compressed. On account thereof, a dual-stage behavior with progressive upholstery hardness is achieved while sitting down.

Dual-zone foams in which by way of use of various foam materials the central region is configured so as to be softer than the side panels are known from the prior art. On account thereof, the seating comfort is to be increased on the one hand, and the lateral support for the user is to be improved on the other hand. To this end, cut foam supports are often used in the central region and hard foam inserts are used in the side panels. In order to avoid submarining of the user under the lap belt in the event of a crash, an anti-submarining function is often provided by an additional component made from a granulated foam material, for example EPP (expanded polypropylene). The additional components mentioned increase costs and reduce durability of the foam parts. Moreover, foam thicknesses are limited in terms of thinness.

A foam part having a first region of foam of a first composition and a second region of foam of a second composition is known from WO 01/74557 A1, wherein a meshwork of polyethylene, jute, gauze, non-woven material or the like is disposed between the first and the second region. However, this foam part does not meet the highest requirements in terms of comfort while sitting down, in particular not when a very soft upholstery layer is desired when initially sitting down. A comparable upholstery construction is also known from WO 2010/102785 A2.

A combination of tubular portions, as is known from EP 1 068 094 B1, and a horizontal separation plane between a first region of the foam part having a first composition and a second region of the foam part having a second composition, as is known from WO 01/74557 A1, is considered impossible to produce. Avoiding air pockets which compromise quality is considered to be impossible to achieve. Likewise, rupturing of the foam part in the region of the separation plane is suspected during demolding of the tubes, in particular when the tubes are continuously hollow for the purpose of seat air-conditioning and a separating non-woven material in the separation plane has to be correspondingly perforated.

SUMMARY OF THE INVENTION

The invention is based on an object of improving a foam part of the type mentioned at the outset, in particular of improving comfort and of lowering production costs by reducing components, and of providing a method and a tool for producing such a foam part.

On account of the first foam tier having a hardness and/or density which is different from the second foam tier and of a plurality of comfort tubes which face the user being provided, comfort can be improved. A hysteresis in the contraction and rebound of the foam part and vibration damping can be better adapted to customer requirements. Additional cut foam supports and hard foam inserts in the side panels, and the adhesive processes which are required in part therefor, may be dispensed with. Moreover, on account thereof, excellent durability is achieved. Reduced foam thicknesses and, on account thereof, reduced foam-part weight become possible. An additional EPP component for ensuring an anti-submarining function may be dispensed with.

The term comfort tube is understood to be an elevated foam-part region which faces the occupant and which may have the most varied geometry. The comfort tubes in the upholstery regions which face the occupant form freestanding elevations in relation to a main body of the foam part.

The comfort tubes may be configured so as to be hollow inside, for example for the purposes of seat air-conditioning, or may be composed of solid material. In the case of comfort tubes which are configured so as to be hollow inside, cylindrical holes run through the comfort tubes and through a main body of the foam part which bears the comfort tubes. A comfort tube here may have no holes, or one or two holes which are offset in relation to one another and which run parallel with one another.

The holes may completely run through the foam part, such that air from the lower side of the foam part may flow through the holes to the upper side of the foam part. Alternatively, at least one hole is configured as a blind hole which does not completely run through the foam part, but only through the region of the associated comfort tube, for example.

Preferably, the holes are configured so as to be cylindrical, in particular circular-cylindrical. On account thereof, the holes may be produced with simple means.

The compliancy of an individual comfort tube may also be influenced in a targeted manner by providing a plurality of holes. Preferably, comfort tubes having a plurality of holes are disposed in the region of the seat center, when viewed perpendicularly to the driving direction.

Optimizing seating comfort in terms of the hardness of the foam parts and optimizing seat ventilation often represent competing objectives when designing foam parts. This conflict of objectives may be avoided in that individual holes of the comfort tubes are configured as blind holes, that is to say that they do not completely run through the foam part. While the blind holes do not offer air circulation through the foam part, a comfort tube having a blind hole does have less compliancy in comparison with a comfort tube having a continuous hole.

The outer contours of the cross sections of the comfort tubes in principle may have all known cross sections of solid bodies, and in particular may be implemented in a round, polygonal, honeycomb-shaped manner, or as described in EP 1 068 094 B1. The outer contours of the comfort tubes are independent from the cross sections of the holes, such that a square comfort tube may have an oval hole, for example.

A preconception widely held in relevant expert circles that a combination of comfort tubes and a foam part which is composed of two foam tiers is not producible has been overcome.

An exact separation of the foam-part regions between the first foam tier and the second foam tier may be achieved by way of a planar meshwork between the foam tiers, in particular a meshwork of polyethylene, jute, gauze, or non-woven material. Ideally, the meshwork during the foaming process is to a modest extent permeable to the foam material, on account of which a fixed connection between the foam tiers and the meshwork is created. The term meshwork is also to be understood to include all textile cloths, woven fabrics, warp-knitted fabrics, and non-woven materials which are known per se.

The meshwork of a foam part designed so as to be comfortable preferably lies between the first foam tier and the second foam tier in an almost horizontal plane of the foam part. The term horizontal here does not mean the mathematically exact horizontal position within a vehicle, but all planes which are almost parallel with that surface of the respective foam part that faces the seat occupant. Seatback upholstery may thus have a horizontal plane which in the vehicle can even be almost vertically oriented. However, in the tool the horizontal plane is mostly almost horizontal. The horizontal plane here need not be mathematically planar, that is to say two-dimensional, but may also have a slightly three-dimensional shaping having bulges and slight elevations and depressions.

If and when the meshwork is disposed in a region of the lowermost points of depressions between at least two comfort tubes, the comfort tubes are initially substantially compressed as the occupant sits down. In the further process of sitting down, the second foam tier is also significantly compressed. On account thereof, a dual-stage behavior with progressive upholstery hardness is achieved while sitting down.

A triple-stage behavior with progressive upholstery hardness while sitting down is achieved in that the meshwork is disposed in a region which is significantly below the depressions between the at least two comfort tubes. In comparison with the afore-described variant having dual-stage behavior while sitting down, the separation plane between the two foam tiers lies deeper, that is to say is more distant from the occupant. The comfort tubes are initially substantially compressed as the occupant sits down. In the further process of sitting down, the layer of the first foam tier which is disposed below the comfort tubes is substantially compressed, the second foam tier initially not being significantly compressed. Finally, the second foam tier is then also significantly compressed.

Alternatively, a triple-stage behavior when sitting down may also be achieved in that the meshwork is disposed in a region above the lowermost points of the depressions between at least two comfort tubes.

A preferred covering fastening to a foam part according to the invention provides that upholstery fastening ducts are provided between individual fields of comfort tubes, through which upholstery fastening ducts the covering is fastenable to fastening means in the foam part, preferably by way of clips, wires, or hooks. Such fastening means may be metal wires embedded in the foam, which are known per se.

Homogeneous distribution of the seating pressure is achieved when the comfort tubes of individual fields which are disposed in a mirror-symmetrical manner in relation to one another are disposed in a mirror-imaged manner in relation to one another. A mirror plane through an upholstery fastening duct which runs in the driving direction and in the seat center is particularly preferable here.

A foam part offers particularly good lateral support to a seat occupant in that the foam part has a third foam tier which has a greater hardness and/or density than the hardness and/or density of the other two foam tiers, in particular in the region of a side panel of the foam part).

A method for producing a foam part according to the invention provides that in a first step the first foam tier having the comfort tubes is foamed, and in a second step the second foam tier is foamed.

A preferred tool for producing a foam part according to the invention comprises a lower part, a frame, in particular for mounting a meshwork which is configured as a non-woven material, and an upper part.

The foam part according to the invention may be produced without air pockets which compromise quality and may be readily demolded, in particular if and when the method according to the invention and the tool according to the invention for producing the foam part according to the invention are used.

The invention is explained in more detail in the following by means of advantageous exemplary embodiments which are illustrated in the figures. However, the invention is not limited to these exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

A vehicle seat, in particular for a motor vehicle, comprises a seat cushion and a back rest.

Figure 1:
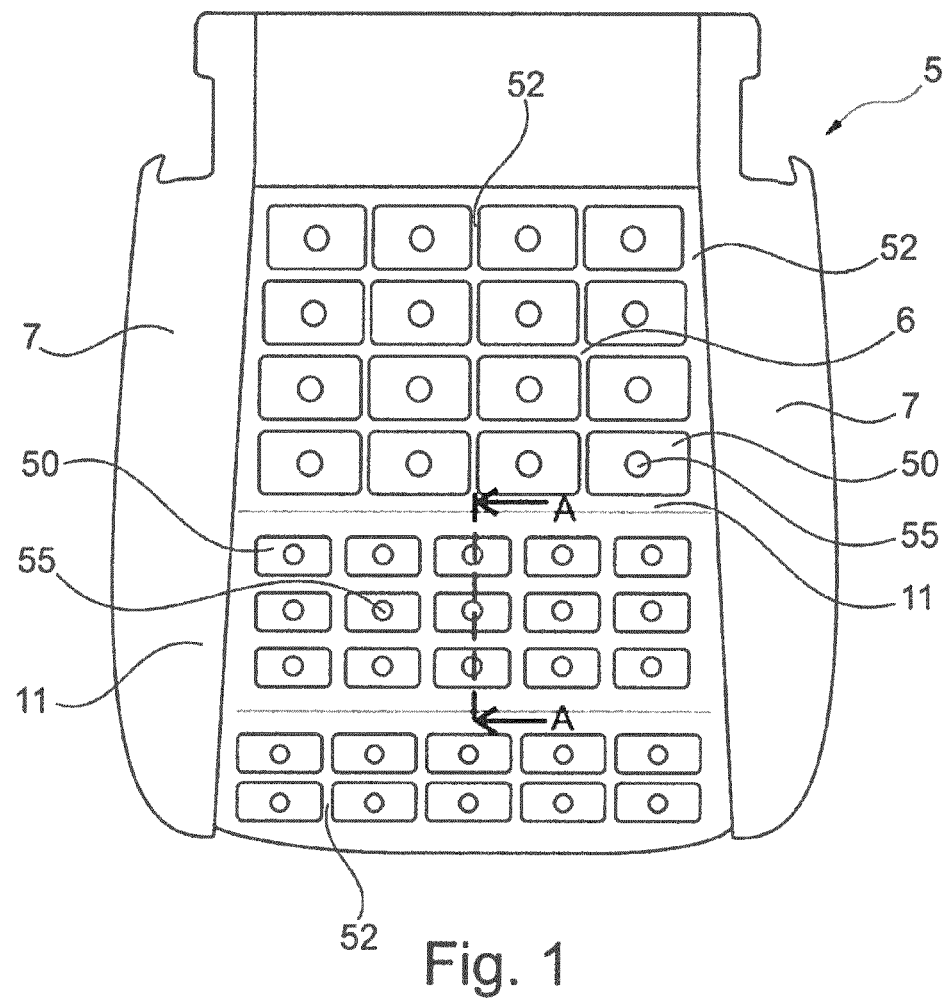
FIG. 1 is a plan view of a first exemplary embodiment which is implemented as a seat-cushion foam part.
Figure 2:
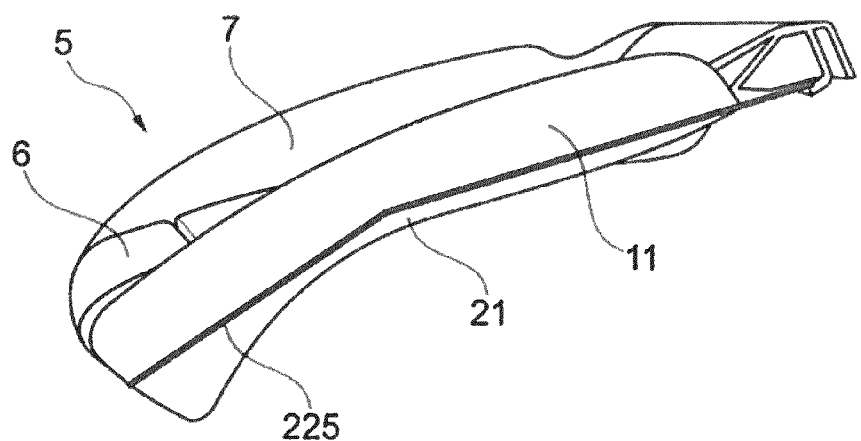
FIG. 2 is a lateral view of the first exemplary embodiment.

In FIGS. 1 and 2, a foam part 5 according to the invention for a seat cushion of the vehicle seat is illustrated as a first exemplary embodiment. The foam part 5 comprises a central region 6 and two side panels 7.

A first foam tier 11 which in the installed position of the vehicle seat is disposed so as to be almost horizontal in the event of the vehicle seat being used faces the user, such that the user by way of his/her buttocks and the rear sides of his/her thighs in part-regions is in contact with the first foam tier 11, optionally by way of intermediate tiers of further upholstery components, in particular of a cloth or leather covering. The first foam tier 11 is preferably composed of soft foam.

In the installed position, a second foam tier 21 is disposed below the first foam tier 11 and is in particular likewise almost horizontally oriented and integrally connected to the first foam tier 11. The second foam tier 21 is composed of a foam material which in relation to the foam material of the first foam tier 11 is firmer, preferably of hard foam.

In a modification of the first exemplary embodiment, the side panels 7 are composed of a third foam material. The second foam tier 21 is composed of a foam material which in relation to the foam material of the first foam tier 11 is harder. The third foam material of the side panels 7 is again harder than the foam material of the second foam tier 21.

A separation plane between the first foam tier 11 and the second foam tier 21 in the present case runs through the central region 6 as well as through the two side panels 7. However, in modifications of the exemplary embodiment, the side panels 7 may also be entirely composed of the second foam tier 21 or of a third foam material. In this case, only the central region 6 has dual-zone foam.

The two foam tiers 11, 21 are foamed in one tool and have hardnesses and densities which differ from one another. The two foam tiers 11 and 21 are produced from polyurethane and in particular by the MDI (methane diphenyl diisocyanate) or the TDI (toluene diisocyanate) foaming method or by a hybrid method. The foam hardnesses are preferably between 4 and 20 kPa, wherein the first foam tier 11 is closer to the lower value and the second foam tier 21 is closer to the upper value. The density of the foam tiers 11, 21 is preferably between 50 g/l and 95 g/l.

Moreover, the central region 6 of the first foam tier 11 has a plurality of comfort tubes 50, in the present case forty-one, which in particular are designed so as to have a rectangular cross section and which increase comfort when first sitting down and on short driving distances. By contrast, the lower and harder second foam tier 21 improves long-term comfort.

The comfort tubes 50 are integrally connected to the first foam tier 11 and form those portions of the central region 6 of the foam part 5 which most directly face the seat occupant. The comfort tubes 50 are disposed so as to be substantially perpendicular to the seat face. In the present case, the cross sections of the comfort tubes 50 are rectangular having rounded edges, but said cross sections may also have any other geometric shape. Depressions 52, the depth of which corresponds to the height of the respective comfort tubes 50 above a base area of the first foam tier 11, lie between adjacent comfort tubes 50.

With a view to good climatic comfort, one hole 55 which completely extends through the foam part 5 is provided in each of the comfort tubes 50. It is also possible for only some individual comfort tubes 50 to be provided with a hole 55 in a targeted manner. The continuous holes 55 enable an effective exchange of air and moisture through the foam part, specifically and advantageously also without active ventilation means, such as ventilators. This is thus a purely passive climate system.

The holes 55 in the present case are configured so as to be circular-cylindrical and preferably in each case lie in a centrical manner in the associated comfort tube 50.

A meshwork which is configured so as to be a non-woven material 225 and which represents a barrier between the two foam tiers 11 and 21 is located between the two foam tiers 11 and 21. The two foam tiers 11 and 21 are in each case connected to the non-woven material 225 in a materially integral and/or a form-fitting manner.

The non-woven material 225 is preferably oriented so as to be perpendicular to the holes 55. In the present case, the non-woven material 225 is configured so as to be planar without holes, such that the non-woven material 225 runs through the holes 55. However, the non-woven material 225 may also be configured so as to be perforated in the region of the holes 55.

Figure 3:
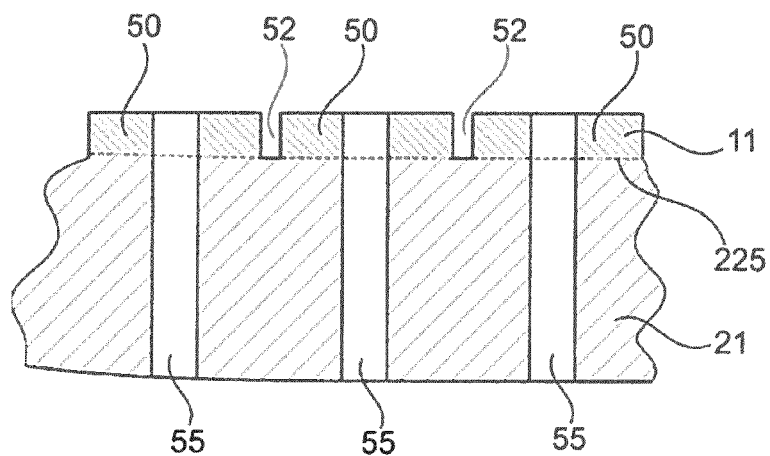
FIG. 3 is a section through the first exemplary embodiment along the line A-A in FIG. 1.

FIG. 3 shows a section through the foam part 5. The non-woven material 225 immediately adjoins the depressions 52 between the individual comfort holes 50, such that the comfort tubes 50 exclusively form the first foam tier 11. When the occupant sits down, the comfort tubes 50 are initially substantially compressed. In the further process of sitting down, the second foam tier 21 is also significantly compressed. On account thereof, a dual-stage behavior with progressive upholstery hardness is achieved while sitting down.

Figure 4:
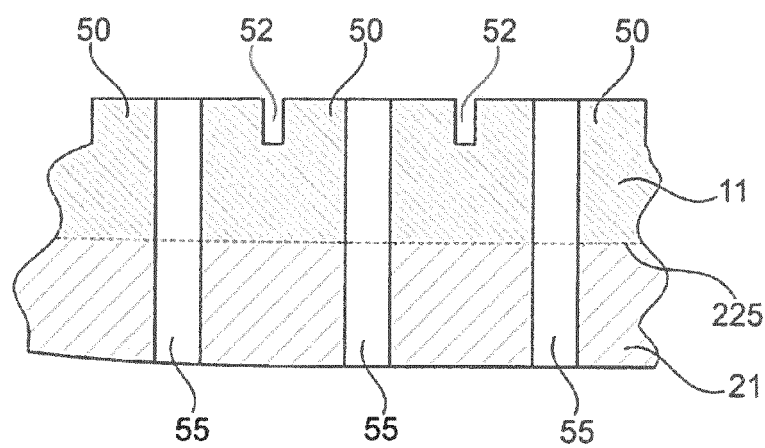
FIG. 4 is a section corresponding to FIG. 3 through a first modification of the first exemplary embodiment.

In FIG. 4, a first modification of the first exemplary embodiment is illustrated. In comparison with the first exemplary embodiment, the non-woven material 225 is disposed so as to be lower, such that the separation plane between the two foam tiers 11 and 21 lies lower down, that is to say is more distant from the occupant. The comfort tubes 50 are initially substantially compressed while the occupant sits down. In the further process of sitting down, that layer of the first foam tier 11 that is disposed below the comfort tubes 50 is substantially compressed, until the second foam tier 21 is finally significantly compressed. On account thereof, a triple-stage behavior with progressive upholstery hardness is achieved while sitting down.

Figure 5:
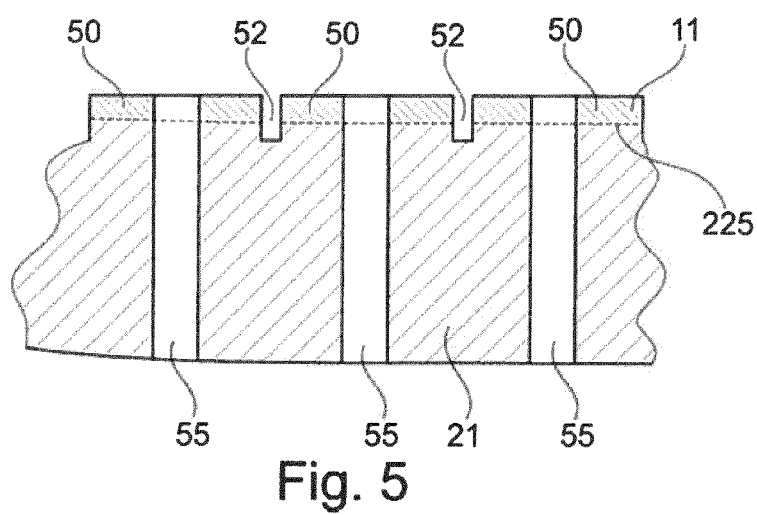
FIG. 5 is a section corresponding to FIG. 3 through a second modification of the first exemplary embodiment.

In FIG. 5, a second modification of the first exemplary embodiment is illustrated. In comparison with the first exemplary embodiment, the non-woven material 225 is disposed so as to be higher, such that the separation between the two foam tiers 11 and 21 lies within the comfort tubes 50, that is to say is closer to the occupant. The upper regions of the comfort tubes 50 which belong to the first foam tier 11 are initially substantially compressed while the occupant sits down. In the further process of sitting down, the lower regions of the comfort tubes 50, which belong to the second foam tier 21, are also more significantly compressed, and finally also the regions of the second foam tier 21, which lie below the comfort tubes, are compressed. On account thereof, a triple-stage behavior with progressive upholstery hardness is achieved while sitting down.

Figure 6:
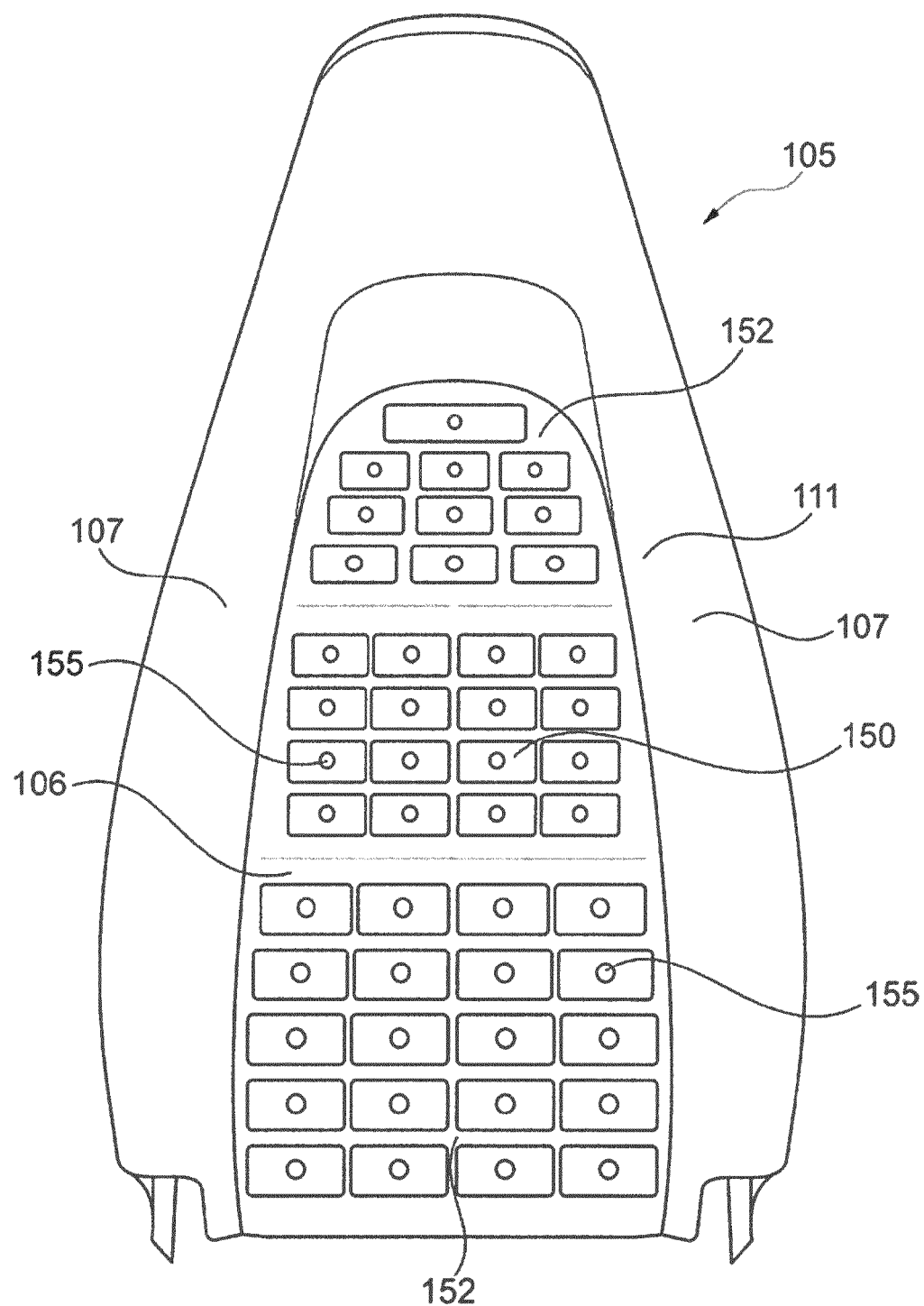
FIG. 6 is a front view of a second exemplary embodiment which is implemented as a seat-back foam part.
Figure 7:
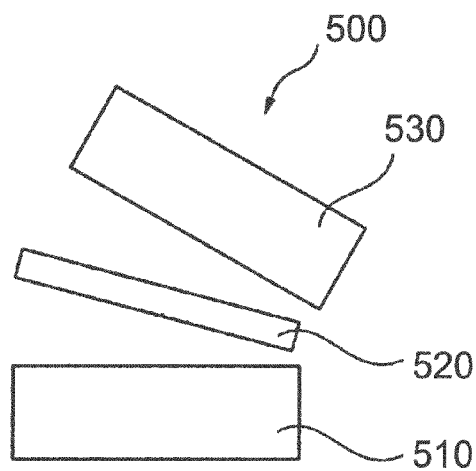
FIG. 7 is an in-principle illustration of a tool according to the invention.
Figure 8:
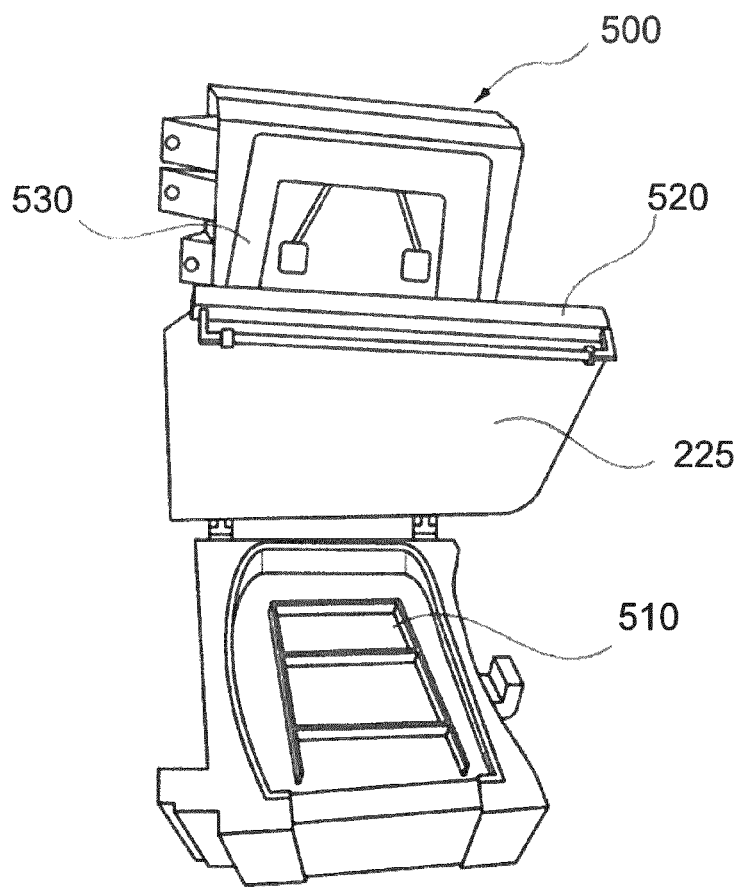
FIG. 8 is a schematic and perspective illustration of the tool from FIG. 7.

A second exemplary embodiment which is illustrated in FIG. 6 is implemented as a foam part 105 for a seat back. The foam part 105 comprises a central region 106 and two side panels 107. The foam part 5 of the first exemplary embodiment and the foam part 105, in the installed and use position, enclose an angle of almost about 90 degrees, for example. A first foam tier 111 of the foam part 105 in the vehicle is oriented so as to be almost vertical and, in the driving direction, oriented toward the front, such that the user by way of his/her back is in contact in part regions with the first foam tier 111, optionally by way of intermediate tiers of further upholstery components, in particular of a cloth or leather covering.

In the installed position, a second foam tier which is not visible in FIG. 6 is disposed behind the first foam tier 111, so as to be in particular likewise almost vertically oriented and in particular integrally connected to the first foam tier 111. The second foam tier is preferably composed of hard foam. The first foam tier 111 and the second foam tier are foamed in one tool and have hardnesses and densities which differ from one another.

Moreover, the first foam tier 111 has a plurality of comfort tubes 150 which increase comfort when first sitting down and on short driving distances. By contrast, the lower and harder second foam tier enhances long-term comfort.

Depressions 152, the depth of which corresponds to the height of the respective comfort tubes 150 above a base area of the first foam tier 111, lie between adjacent comfort tubes 150.

With a view to good climatic comfort, one hole 155 which completely extends through the foam part 105 is provided in each tube section of the comfort tubes 150.

The first foam tier 111 and the second foam tier are preferably produced by the MDI (methane diphenyl diisocyanate) or the TDI (toluene diisocyanate) foaming method. The foam hardnesses are in typical ranges which are known per se.

In a modification of the second exemplary embodiment, the foam part 105 comprises a first foam tier 111, but no further and in particular no second foam tier. This construction is preferably selected when a very modest foam thickness of the foam part 105 is to be achieved, or a simple tool construction is to be achieved.

The production of the foam parts 5 and 105 according to the invention is carried out in a tool 500. The tool 500 comprises a key-type lower part 510, a frame 520 which is pivotable in relation to the lower part 510 and which mounts a non-woven material 225 as an intermediate insert, and a lid-type upper part 530 which is pivotable in relation to the frame 520. The tool contours for producing the comfort tubes 50 and 150 are provided in the lower part 510, such that the foam part 5 in relation to its installed position in the vehicle is produced upside down.

In a first foaming operation, the material for the first foam tier 11, 111 is filled into the lower part 510. Subsequently, the frame 520 together with the mounted non-woven material 225 is pivoted onto the lower part 510, such that the non-woven material 225 bears on the surface of the second foam tier 21, 221. In a second foaming operation, the material for the second foam tier 21 is introduced into the space between the frame 520 and the upper part 330, and the upper part 530 is subsequently closed.

Figure 9:
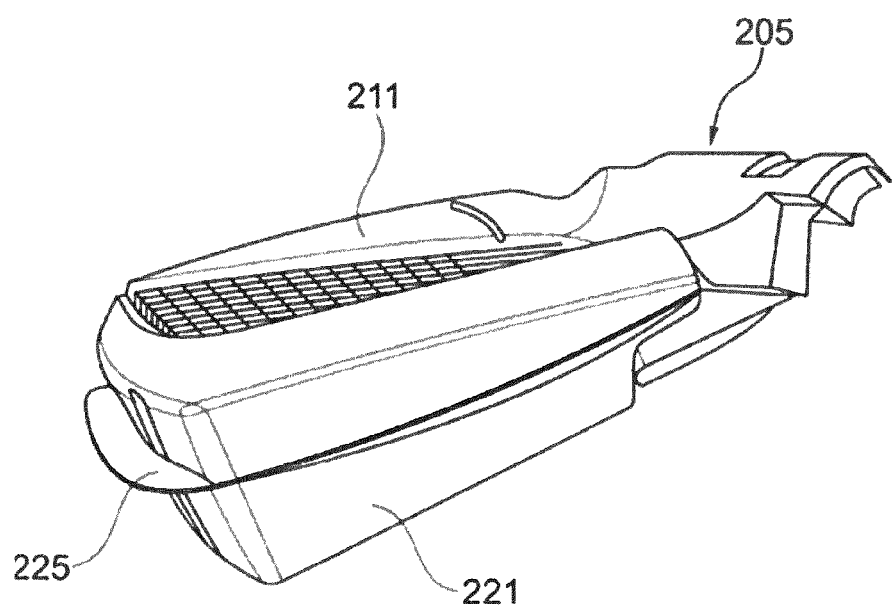
FIG. 9 is a perspective view of a third exemplary embodiment which is implemented as a seat-cushion foam part.
Figure 10:
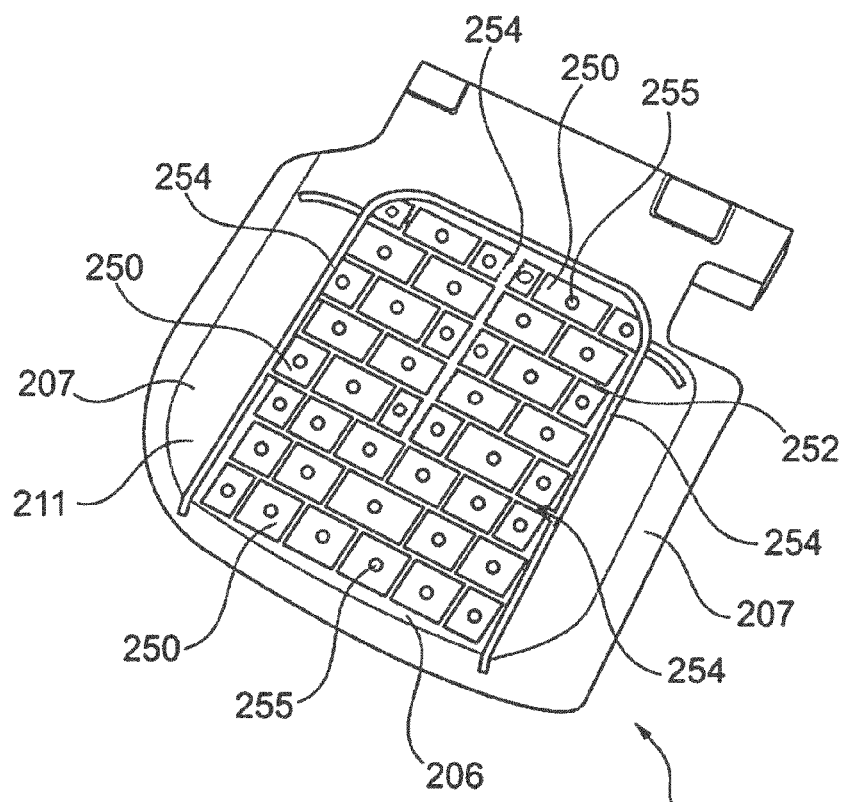
FIG. 10 is a plan view of the third exemplary embodiment.

A third exemplary embodiment which is illustrated in FIGS. 9 and 10 largely corresponds to the first exemplary embodiment, in as far as the former is not subsequently described so as to deviate therefrom. Components and contours with the same function have reference signs which in relation to the first exemplary embodiment are increased by a value of 200. A production method and a tool for the third exemplary embodiment likewise in each case largely correspond to the afore-described production method and tool.

The third exemplary embodiment is a foam part 205 for a seat cushion of the vehicle seat. The foam part 205 comprises a central region 206 and two side panels 207.

A first foam tier 211 which in the installed position of the vehicle seat is disposed so as to be almost horizontal faces the user in the event of the vehicle seat being used. The first foam tier 211 is preferably composed of soft foam.

In the installed position, a second foam tier 221 is disposed below the first foam tier 211 and is in particular likewise almost horizontally oriented and integrally connected to the first foam tier 211. The second foam tier 221 is composed of a foam material which in relation to the foam material of the first foam tier 211 is firmer, preferably of hard foam.

The two foam tiers 211 and 221 are foamed in one tool and have hardnesses and densities which differ from one another.

Moreover, the first foam tier 211 has a plurality of comfort tubes 250, in the present case forty-three, which have a largely rectangular cross section. Some individual comfort tubes 250 have an almost square cross section. Depressions 252, the depth of which corresponds to the height of the respective comfort tubes 250 above a base area of the first foam tier 211, lie between adjacent comfort tubes 250.

The comfort tubes 250 are subdivided into three fields of immediately adjacent comfort tubes 250. The limits of the fields are formed by upholstery fastening ducts 254. The upholstery fastening ducts 254 offer a plurality of passages for first fastening means which are fastened to a seat covering and for second fastening means which interact with these first fastening means and are incorporated in the foam part 205. The fastening means, such as wires and hooks, for example, which are known per se, are not illustrated in the Figures.

In a front field of comfort tubes 250 which is positioned below the thighs of an occupant, that is to say in the front region of the central region 206 of the foam part 205, in the present case seventeen comfort tubes 250 are distributed across the entire width of the central region 206. In two further rear fields of comfort tubes 250, which fields are in each case positioned in a region under the ischial tuberosities of the occupant, in the present case thirteen comfort tubes 250 are in each case distributed. In the transverse direction, each of the two fields lies in each case between an upholstery fastening duct 254 in the seat center and in each case one upholstery fastening duct 254 which is adjacent to one of the two side panels 207. The distribution and the shaping of the comfort tubes 250 in the two fields are mirror-symmetrical in relation to one another.

The comfort tubes 250 are integrally connected to the first foam tier 211 and form those portions of the central region 206 of the foam part 205 which most directly face the seat occupant. The comfort tubes 250 are disposed so as to be substantially perpendicular to the seat face. In the present case, the cross sections of the comfort tubes 250 are rectangular having rounded edges, but said cross sections may also have any other geometric shape.

With a view to good climatic comfort, one hole 255 which completely extends through the foam part 205 is provided in some of the comfort tubes 250. However, individual comfort tubes 250 which in the present case are disposed so as to be adjacent to the side panels 207 are formed from solid material and thus have no hole.

A meshwork which is configured so as to be a non-woven material 225 and which represents a barrier between the two foam tiers 211 and 221 is located between the two foam tiers 211 and 221. The two foam tiers 211 and 221 are in each case connected to the non-woven material 225 in a materially integral and/or a form-fitting manner.

The non-woven material 225 is preferably oriented so as to be perpendicular to the holes 255. In the present case, the non-woven material 225 is configured so as to be planar without holes, such that the non-woven material runs through the holes 255. However, the non-woven material 225 may also be configured so as to be perforated in the region of the holes 255.

Figure 11:
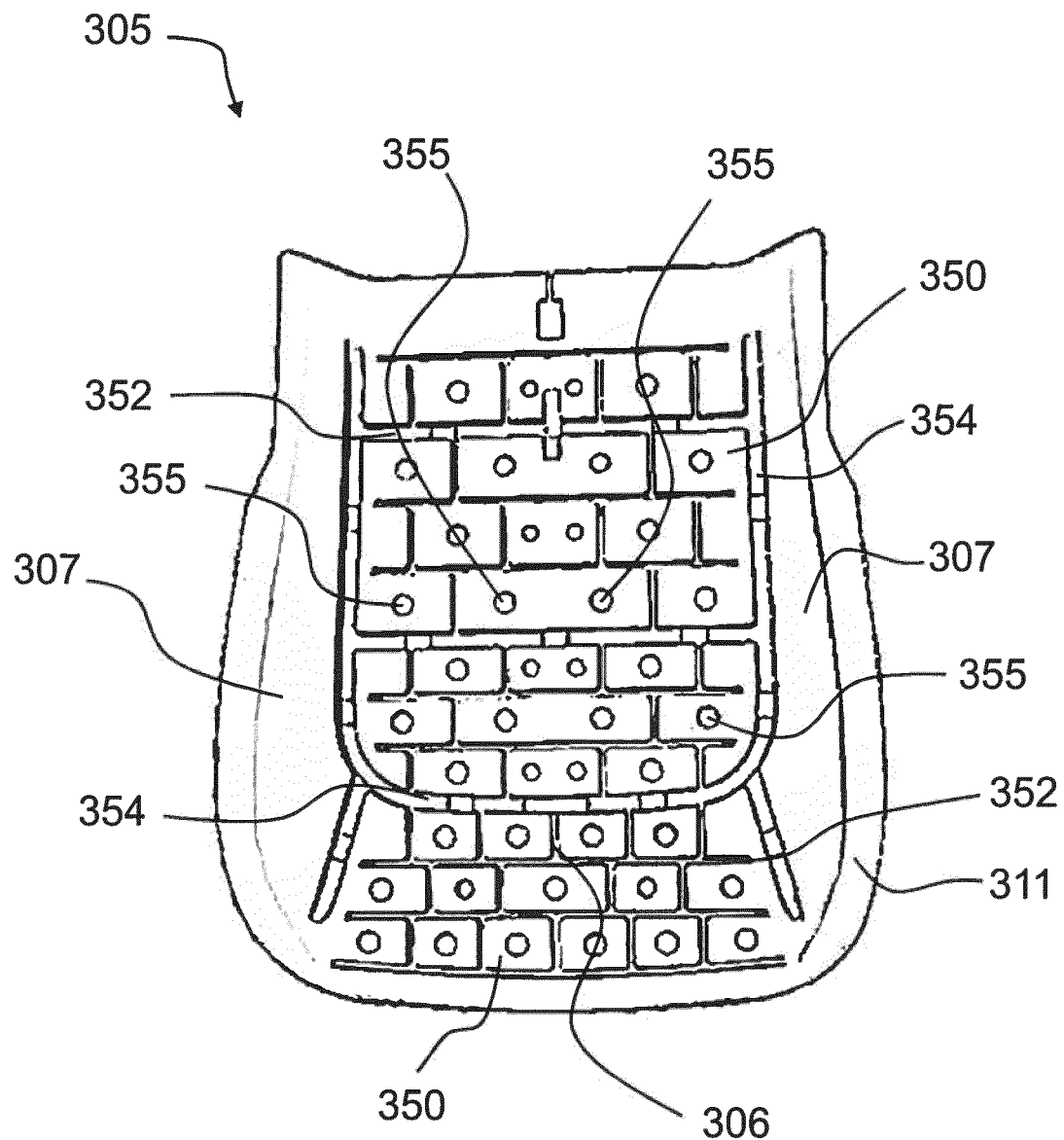
FIG. 11 is a plan view of a fourth exemplary embodiment.

A fourth exemplary embodiment which is illustrated in FIG. 11 largely corresponds to the first exemplary embodiment, in as far as the former is not subsequently described so as to deviate therefrom. Components and contours with the same function have reference signs which in relation to the first exemplary embodiment are increased by a value of 300. A production method and a tool for the fourth exemplary embodiment likewise in each case largely correspond to the afore-described production method and tool.

The fourth exemplary embodiment is a foam part 305 for a seat cushion of the vehicle seat. The foam part 305 comprises a central region 306 and two side panels 307.

A first foam tier 311 which in the installed position of the vehicle seat is disposed so as to be almost horizontal faces the user in the event of the vehicle seat being used. The first foam tier 311 is preferably composed of soft foam.

In the installed position, a second foam tier which is not illustrated in FIG. 11 is disposed below the first foam tier 311 and is in particular likewise almost horizontally oriented and integrally connected to the first foam tier 311. The second foam tier is composed of a foam material which in relation to the foam material of the first foam tier 311 is firmer and/or harder, preferably of hard foam.

The first foam tier 311 moreover has a plurality of comfort tubes 350 which have a largely rectangular cross section. Some individual comfort tubes 350 have an almost square cross section. Depressions 352 having variable depths lie between adjacent comfort tubes 350.

The comfort tubes 350 are subdivided into two fields of immediately adjacent comfort tubes 350. The limits of the fields are largely formed by upholstery fastening ducts 354. The upholstery fastening ducts 354 offer a plurality of passages for first fastening means which are fastened to a seat covering and for second fastening means which interact with these first fastening means and are incorporated in the foam part 305. The fastening means, such as wires and hooks, for example, which are known per se, are not illustrated in FIG. 11.

The comfort tubes 350 are integrally connected to the first foam tier 311 and form those portions of the central region 306 of the foam part 305 which most directly face the seat occupant. The comfort tubes 350 are disposed so as to be substantially perpendicular to the seat face. In the present case, the cross sections of the comfort tubes 350 are rectangular having rounded edges, but said cross sections may also have any other geometric shape.

With a view to good climatic comfort, in each case one hole 355 or two holes 355 is/are provided in some of the comfort tubes 350. In the present case, the holes 355 are configured so as to be circular-cylindrical and preferably lie in a centrical manner in the associated comfort tube 350. Cross sections which deviate from a circular-cylindrical shape, for example polygonal cross sections or elliptical cross sections, are likewise possible. Comfort tubes 350 having two parallel holes 355 which are positioned so as to be offset in relation to one another are provided in the center of the central region 306.

Some of the holes 355 completely extend through the foam part 305. Further holes 355 are configured as blind holes, such that the holes 355 do not completely run through the foam part 305 but preferably only through the first foam tier 311. It is also conceivable for the holes 355 which are configured as blind holes to not completely run through the first foam tier 311, or run into the second foam tier. Individual comfort tubes 350 which in the present case are disposed so as to be adjacent to the side panels 307 are formed from solid material and thus have no hole.

By means of a combination of holes 355 which are configured as blind holes and continuous holes 355 within a foam part 305, the seating comfort and the seating climate may be influenced in a targeted manner.

In a modification of the preceding exemplary embodiments, the side panels 7, 107, 207, 307 are composed of a third foam material which in relation to the foam material of the second foam tier 21, 221 is firmer and/or harder. The separation plane between the first foam tier 311 and the second foam tier then does not run through the side panels 7, 107, 207, 307.

The features disclosed in the above description, the claims and the drawings both individually as well as in combination may be of relevance to the implementation of the invention in its various design embodiments. For example, a horizontal dual-zone foam, a horizontal dual-zone foam with climatic functionality, a horizontal dual-zone foam with comfort tubes and a horizontal dual-zone foam with comfort tubes and with climatic functionality may thus be formed as possible variants for the seat cushion. Blind holes may be employed in modifications of all the exemplary embodiments.

Conventional dual-zone foam may also be advantageously upgraded by way of climatic functionality and/or by way of the comfort tubes.

While specific embodiments of the invention have been shown and described in detail to illustrate the application of the principles of the invention, it will be understood that the invention may be embodied otherwise without departing from such principles.

The invention claimed is:

1. A foam part for a vehicle seat, the foam part comprising:
 a first foam tier adapted to face in a direction of a user; and
 a second foam tier adapted to face in a direction away from the user, wherein the first foam tier has at least one of a hardness and a density which is different from at least one of a hardness and a density of the second foam tier and the first foam tier has a plurality of comfort tubes adapted to face the user, the comfort tubes comprising an elevated foam-part region adapted to face the user, at least one of the comfort tubes having a hole, wherein depressions are provided between adjacent comfort tubes.

2. The foam part as claimed in claim 1, wherein the comfort tubes define an outer surface of the first foam tier.

3. The foam part as claimed in claim 1, wherein the hole extends in a cylindrical manner in the at least one of the comfort tubes.

4. The foam part as claimed in claim 1, wherein the at least one of the comfort tubes has at least another hole to provide a plurality of holes in the at least one of the comfort tubes.

5. The foam part as claimed in claim 4, wherein at least one of the holes is configured as a blind hole.

6. The foam part as claimed in claim 1, further comprising a meshwork, wherein the first foam tier is separated from the second foam tier by the meshwork and the meshwork is formed of at least one of polyethylene, jute, gauze, and non-woven material.

7. The foam part as claimed in claim 6, wherein a separation plane, which is formed by the meshwork lies between the first foam tier and the second foam tier in an almost horizontal plane of the foam part.

8. The foam part as claimed in claim 7, wherein the separation plane is disposed in a region of lowermost points of depressions between at least two adjacent comfort tubes.

9. The foam part as claimed in claim 7, wherein the separation plane is disposed in a region below depressions between at least two adjacent comfort tubes.

10. The foam part as claimed in claim 7, wherein the separation plane is disposed in a region above lowermost points of the depressions between at least two adjacent comfort tubes.

11. The foam part as claimed in claim 1, wherein the comfort tubes are disposed in at least two fields which are separated from one another by upholstery fastening ducts.

12. The foam part as claimed in claim 11, wherein the fields are mirror images of one another.

13. The foam part as claimed in claim 1, wherein the foam part has a third foam tier which has a greater hardness and/or density than the hardness and/or density of the other two foam tiers in a region of a side panel of the foam part.

14. A method for producing a foam part comprising a first foam tier adapted to face in a direction of a user and a second foam tier adapted to face in a direction away from the user, wherein the first foam tier has a hardness and/or density which is different from the second foam tier and the first foam tier has a plurality of comfort tubes which face the user, the method comprising the steps of:

foaming the first foam tier having the comfort tubes, the comfort tubes comprising an elevated foam-part region adapted to face the user, at least one of the comfort tubes having a hole, wherein depressions are provided between adjacent comfort tubes; and foaming the second foam tier subsequent to said step of foaming the first foam tier.

15. The method as claimed in claim 14, wherein a separation plane, which is formed by a meshwork lies between the first foam tier and the second foam tier in an almost horizontal plane of the foam part.

16. The method as claimed in claim 15, wherein the comfort tubes are disposed in at least two fields which are separated from one another by upholstery fastening ducts.

17. The method as claimed in claim 15, wherein the separation plane is disposed in a region of lowermost points of the depressions between at least two adjacent comfort tubes.

18. The method as claimed in claim 15, wherein the separation plane is disposed in a region below the depressions between at least two adjacent comfort tubes.

19. The method as claimed in claim 15, wherein the separation plane is disposed in a region above lowermost points of the depressions between at least two adjacent comfort tubes.

* * * * *